Figures 1, 2:
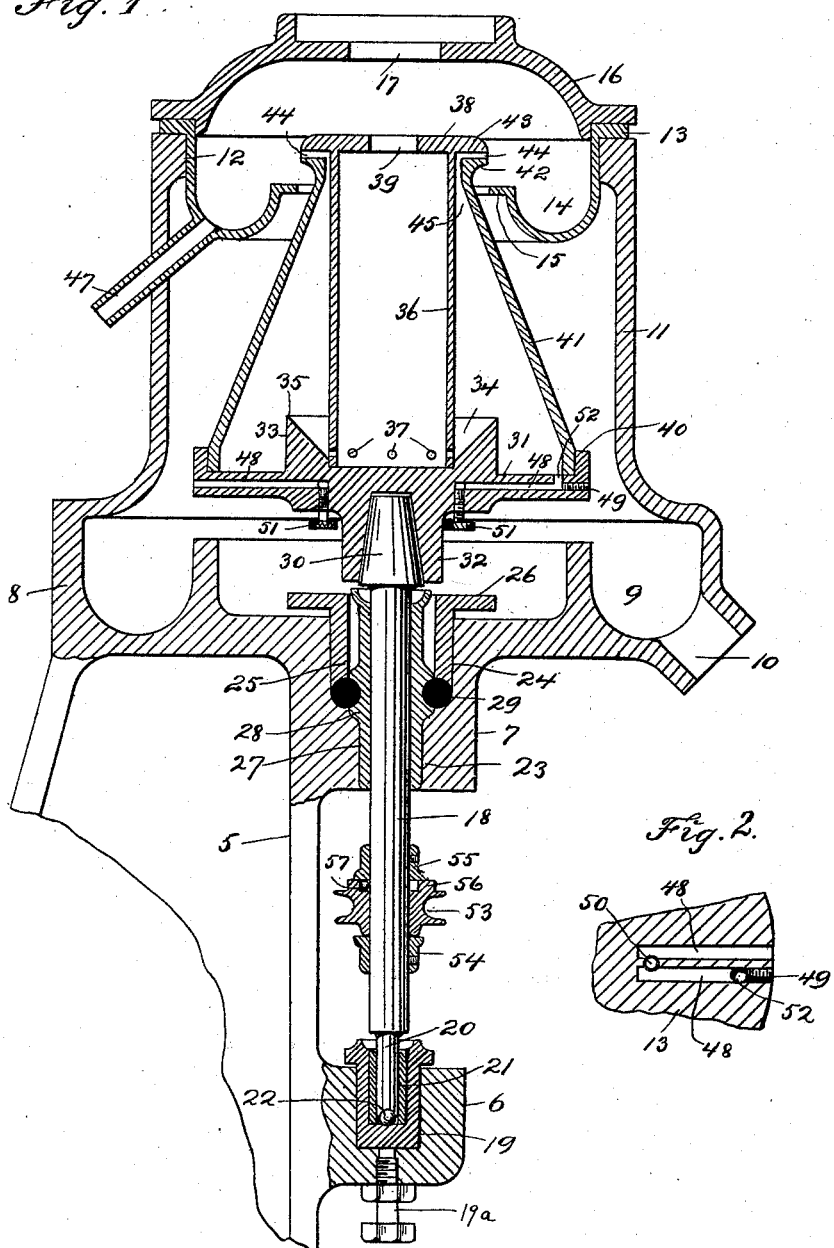

No. 610,058. Patented Aug. 30, 1898.
F. G. JONES.
CENTRIFUGAL CREAMER.
(Application filed Aug. 25, 1897.)
(No Model.)

WITNESSES:
C. Nordfors
C. Gerst

INVENTOR
Frederick G. Jones
BY
Edgar Tate &
ATTORNEYS.

THE NORRIS PETERS CO., PHOTO-LITHO., WASHINGTON, D. C.

UNITED STATES PATENT OFFICE.

FREDERICK GEORGE JONES, OF BRISTOL, ENGLAND.

CENTRIFUGAL CREAMER.

SPECIFICATION forming part of Letters Patent No. 610,058, dated August 30, 1898.

Application filed August 25, 1897. Serial No. 649,462. (No model.)

*To all whom it may concern:*

Be it known that I, FREDERICK GEORGE JONES, a subject of the Queen of Great Britain, residing at Bristol, in the county of Bristol and Kingdom of England, have invented certain new and useful Improvements in Machines for Separating Cream from Milk, of which the following is a full and complete specification, such as will enable those skilled in the art to which it appertains to make and use the same.

This invention relates to apparatus for separating cream from milk by centrifugal force; and the objects thereof are, first, to provide means to withdraw the blue milk from the bottom of the drum and the cream from the top of the same; second, to centrifugally introduce the milk into the drum at a point between the top and the bottom or above the discharge-spout for the blue milk; third, to provide special means to regulate the discharge of the blue milk at the bottom of the drum; fourth, to adjustably mount the shaft on which the drum is supported so that the said drum may be regulated with reference to the casing, and, fifth, to provide means to bring the drum to a gradual stop when the power is cut off.

The invention is fully disclosed in the following specification, of which the accompanying drawings form a part, in which—

Figure 1 is a central vertical section of my improved machine; Fig. 2, a sectional detail of the construction.

In the drawings forming part of this specification like parts of my improvement are designated by the same numerals of reference in each of the views, and in the practice of my invention I provide a frame or support 5, which is provided with shoulders or projections 6 and 7, and on the top of said frame I mount a casing which consists of a base 8, having a circular groove or recess 9, provided with a discharge-spout 10, connected with one side thereof, and the said base is provided with an upwardly-directed tubular portion 11. Mounted on the top of the tubular portion 11 is a plate 14, which is U-shaped in cross-section and the outer arm of which is longer and provided at the upper end with an outwardly-directed annular flange 13, which rests upon the top of the said tubular portion 11, and the shorter arm is provided with an inwardly-directed angular extension 15 at the upper end thereof of a predetermined width, and mounted upon the top of the said tubular portion 11 or upon the flange 13 is a cap or cover 16, provided with a central opening 17.

Mounted in the shoulders or projections 6 and 7 and revoluble therein is a vertical shaft 18, the lower end of which is supported in a tubular socket 19, which is set into a circular socket or recess in the shoulder 6, and a set-screw $19^a$ is passed through the bottom of said shoulder 6 and bears upon the lower end of the tubular socket 19, whereby said socket may be raised and lowered and with it the shaft 18, as will be readily understood, and the lower end of the shaft 18 is reduced in size, as shown at 20, and the said socket 19 is provided with a bearing-surface 21, composed of any antifrictional material, and mounted in the lower end of the said socket 19 are a plurality of balls 22, forming a ball-bearing. The shoulder 7 is connected at the upper side with the base 8 and is provided with a central bore or passage 23, the upper end of which is enlarged, as shown at 24, and placed in the enlarged bore or portion 23 is a tubular casing 25, which is provided at its upper end with a flange or rim 26, and passing through said tubular casing and through the central bore or passage 23 in the shoulder 7 is a tubular sleeve 27, which is enlarged centrally, as shown at 28, and provided with an annular groove in which is placed a rubber or other elastic ring 29 and on which the lower end of the tubular casing 25 rests.

The upper end of the shaft 18 is provided with a head 30, and mounted thereon is a drum consisting of a bottom portion 31, which is circular in form and which is provided with an upwardly-directed annular flange or rim 40, within which is mounted the lower end of a frusto-conical shell 41, the apex of which is directed upwardly and the upper end of which is provided with an outwardly-directed flange or rim 42. The bottom portion 31 of the said drum is provided centrally of the lower side thereof with a socket 32, into which the head 30 of the shaft 18 projects, and the said bottom portion is provided centrally of the upper side with a cylindrical raised portion 33, which is provided on the upper side with a flaring chamber 34, whereby an annular flange or rim 35 is formed, and secured within the said chamber 34 is a milk-tube 36, having perforations 37 at the lower end thereof within said chamber 34, and the upper end of the said milk-tube 36 is closed by a cap 38, in which is a central opening 39.

The cap 38 of the milk-tube 36 is provided with an annular flange or rim 43, and between the flange or rim 43 of the cap 38 of the milk-tube 36 and the flange or rim 42 of the shell 41 are ports or passages 44, any desired number of which may be employed, and a narrow annular space 45 is also provided between the upper end of the shell 41 and the upper end of the milk-tube 36.

I also provide a discharge-spout 47, which passes through the tubular portion 11 of the casing and communicates with the annular groove formed in the upper side of the U-shaped plate 14, and the bottom 31 of the drum is provided with radial bores 48, which I arrange in pairs, as shown in Fig. 2, and one of which is closed at its outer end by a screw-plug 49, and said bores or passages are in communication at their inner ends by a passage 50, below which is a vertical bore in which is mounted a set-screw 51, by which the said passage 50 may be closed or partially closed, as will be readily understood, and the bottom 31 is provided adjacent to the outer edge thereof with a bore or opening 52, which communicates with the passage 48, closed by the screw-plug 49, it being understood that any number of these bores or passages may be used and that the one in which the screw-plug 49 is mounted is in communication with the interior of the drum in the manner described and the outer end of the other passage is open, as clearly shown in Fig. 2, and by means of the screw-plug 49 and the set-screw 51 the flow of the blue milk through the passages may be regulated, as will be readily understood.

The shaft 18 is driven by a grooved pulley 53, which is mounted thereon between the shoulders or projections 6 and 7, and said grooved pulley is supported by a collar 54, and above the said pulley is placed another collar 55, and these collars are held in position by set-screws, as shown in Fig. 1, and formed in the upper side of the pulley 53 are segmental slots or grooves 56, three of which are shown in Fig. 2, and in each of these grooves or slots is placed a steel ball 57, and in revolving the shaft 18 and the drum mounted thereon a cord or belt is passed around the pulley 53 and said pulley and said shaft are rotated, and when the pulley is stopped the shaft 18 and the drum mounted thereon will continue to revolve and will gradually come to a standstill, this result being accomplished by means of the balls 57, which are mounted in the segmental grooves 58, said grooves being larger at one end than at the other.

The operation will be readily understood from the foregoing description, when taken in connection with the accompanying drawings and the following statement thereof. The milk is poured into the milk-tubes 36 through the opening 17 in the cap 16 and the opening 39 in the cap 38 of the said milk-tube. The shaft 18 and drum mounted thereon are rapidly revolved and the milk passes out through the ports or openings 37 in the bottom of said milk-tube and upwardly over the inclined wall of the central chamber 34 and flange 35 thereof and is projected into the body portion of the drum, above the bottom thereof, as will be readily understood. In this operation the cream is thrown inwardly by the difference of centrifugal force and passes upwardly and outwardly through the ports or passages 34 into the circular groove or trough on the plate 14 and passes through the spout 47 into a suitable receptacle prepared therefor, and the blue milk passes through the opening 52 into the passages 48, and is forced inwardly through one of said passages and into the other through the passage 50 and outwardly through the end thereof, as will be readily understood, it being understood that since the milk must pass inwardly through the said passage before being delivered the same will not flow by reason of the centrifugal force until forced to do so by the pressure of the blue milk in the drum, so that by this construction means are provided to regulate to a certain extent the flow of the blue milk from the drum, and the flow may be further regulated by the set-screw 51 or screw-threaded plug 49, as described.

It will also be understood that by means of the pulley mechanism when the motor-power is stopped the revolution of the drum will not be stopped suddenly, thereby churning the milk and cream in the drum together.

It will also be understood that by reason of the shaft 18 being vertically adjustable by the screw 19$^a$ and the drum 41 being conical the same may be elevated so as to closely fit in the central opening of the plate 14 or the inwardly-directed flange 15 thereof.

Having fully described my invention, I claim as new and desire to secure by Letters Patent—

1. In a machine for separating cream from milk, a drum provided with means for withdrawing the blue milk at the bottom thereof, comprising a plurality of radial bores or passages, each of which consists of two radial bores 48, a communicating passage 50 at the inner end thereof, a passage 52, communicating with the interior of the drum, and means to regulate the flow of milk through the said passages comprising a screw-threaded plug 49 and a set-screw 50, substantially as and for the purpose described.

2. In a machine for separating cream from milk, a drum revolubly mounted in a suitable casing and provided with means to withdraw the blue milk from the bottom thereof comprising a plurality of radial passages, each of which consists of two radial passages 48, a communicating passage 50 at the inner end thereof and a passage 52 communicating with the interior of the drum and the cream from the top thereof, and means to centrifugally introduce the milk into the drum above the said blue-milk passage consisting of a cylindrically-raised portion formed centrally on the upper side of the base of said drum and provided with a flaring chamber or recess in the upper side thereof, a milk-tube mounted centrally of said drum and extending into said flaring chamber, said milk-tube being provided at the bottom thereof with a plurality of openings whereby milk is introduced into the said flaring chamber at the bottom thereof and means for introducing milk into said milk-tubes, substantially as shown and described.

In testimony that I claim the foregoing as my invention I have signed my name, in presence of the subscribing witnesses, this 3d day of August, 1897.

FREDERICK GEORGE JONES.

Witnesses:
HENRY COOKE,
ANDREW WOOD WILKINSON.